United States Patent
Murakami

(10) Patent No.: US 11,115,199 B2
(45) Date of Patent: Sep. 7, 2021

(54) INFORMATION PROCESSING METHOD, AND COMPUTER PROGRAM PRODUCT

(71) Applicant: KABUSHIKI KAISHA TOSHIBA, Minato-ku (JP)

(72) Inventor: Akira Murakami, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 146 days.

(21) Appl. No.: 16/508,928

(22) Filed: Jul. 11, 2019

(65) Prior Publication Data
US 2020/0028676 A1    Jan. 23, 2020

(30) Foreign Application Priority Data

Jul. 18, 2018  (JP) .............................. JP2018-135305
May 13, 2019  (JP) .............................. JP2019-090823

(51) Int. Cl.
  *H04L 9/08*   (2006.01)
  *H04B 10/70*  (2013.01)
(52) U.S. Cl.
  CPC ........... *H04L 9/0858* (2013.01); *H04B 10/70* (2013.01); *H04L 9/0855* (2013.01); *H04L 9/0891* (2013.01); *H04L 9/0894* (2013.01)
(58) Field of Classification Search
  CPC ... H04L 9/0858; H04L 9/0855; H04L 9/0891; H04L 9/0894; H04L 9/0852; H04B 10/70
  See application file for complete search history.

(56) References Cited

U.S. PATENT DOCUMENTS

| | | | | |
|---|---|---|---|---|
| 7,627,126 | B1* | 12/2009 | Pikalo .................. | H04L 9/0858 356/473 |
| 2003/0169880 | A1* | 9/2003 | Nambu ................. | H04L 9/0852 380/256 |
| 2014/0037087 | A1* | 2/2014 | Tanaka ................. | H04L 9/0816 380/44 |
| 2014/0143867 | A1 | 5/2014 | Tanizawa et al. | |

(Continued)

FOREIGN PATENT DOCUMENTS

| | | |
|---|---|---|
| EP | 1 445 890 A1 | 8/2004 |
| EP | 1 742 408 A2 | 1/2007 |

(Continued)

OTHER PUBLICATIONS

Bennett, C.H. et al. "Quantum cryptography: Public key distribution and coin tossing" Theoretical Computer Science, vol. 560, XP029103017, 2014, 5 pages.

(Continued)

*Primary Examiner* — Matthew Smithers
(74) *Attorney, Agent, or Firm* — Oblon, McClelland, Maier & Neustadt, L.L.P.

(57) ABSTRACT

According to one embodiment, an information processing method includes a monitoring step and a key provision step. The monitoring step includes monitoring an operation state of an information processing device including a key generating unit that generates key information shared among a plurality of devices using a quantum key distribution technique. The key provision step includes providing the generated key information when the operation state satisfies a predetermined condition and stopping the provision of the generated key information when the operation state does not satisfy the condition.

12 Claims, 6 Drawing Sheets

(56) References Cited

U.S. PATENT DOCUMENTS

| | | | |
|---|---|---|---|
| 2016/0112189 A1* | 4/2016 | Tomaru | H04L 9/06 |
| | | | 380/268 |
| 2016/0156466 A1* | 6/2016 | Kirby | H04B 10/85 |
| | | | 398/40 |
| 2016/0191173 A1* | 6/2016 | Malaney | H04B 10/70 |
| | | | 455/899 |
| 2017/0237559 A1* | 8/2017 | Yuan | H04L 9/3236 |
| | | | 380/283 |
| 2017/0264433 A1* | 9/2017 | Tanizawa | H04L 63/061 |
| 2018/0255039 A1* | 9/2018 | Takahashi | H04L 9/0852 |
| 2019/0190707 A1* | 6/2019 | Tomita | H04L 9/0858 |

FOREIGN PATENT DOCUMENTS

| | | |
|---|---|---|
| JP | 6129523 B2 | 5/2017 |
| WO | WO 2018/043742 A1 | 3/2018 |

OTHER PUBLICATIONS

"FIPS PUB 140-2: Security Requirements for Cryptographic Modules" U.S. Department of Commerce, XP002439510, 2001, 69 pages.

Valerio Scarani, et al., "The Security of Practical Quantum Key Distribution", Rev. Mod. Phys. 81 (3), 2009, 52 pages.

Hoi-Kwong Lo, et al., "Secure Quantum Key Distribution", Nature Photonics, DOI: 10. 1038/NPHOTON. 2014, 13 pages.

\* cited by examiner

INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-135305, filed on Jul. 18, 2018; and Japanese Patent Application No. 2019-090823, filed on May 13, 2019, the entire contents of all of which are incorporated herein by reference.

FIELD

Embodiments described herein relate generally to an information processing method, and a computer program product.

BACKGROUND

A quantum key distribution (QKD) technique for safely sharing an encryption key using a single photon transmitted continuously between a transmitting device and a receiving device that are connected via an optical fiber is known.

However, in the related art, there are cases in which safety of an encryption key is not kept. For example, in a safety theory of QKD, there are a plurality of prerequisites to satisfy, but in a case in which a certain abnormality occurs, and some of those prerequisites are not satisfied, an encryption key is likely to be unsafe.

DETAILED DESCRIPTION

Figure 1:
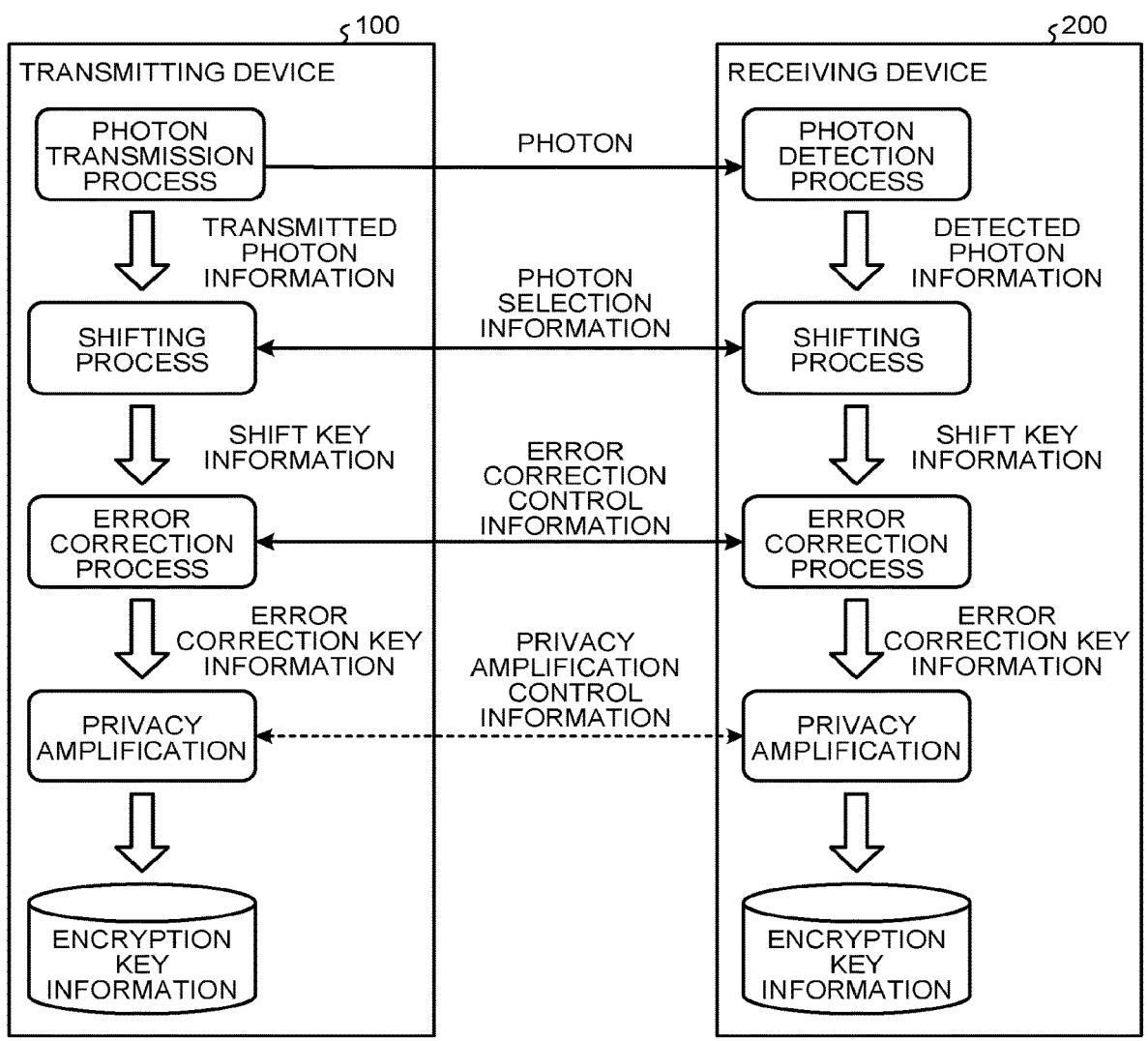
FIG. 1 is a diagram illustrating an example of a quantum key distribution process.

According to one embodiment, an information processing method includes a monitoring step and a key provision step. The monitoring step includes monitoring an operation state of an information processing device including a key generating unit that generates key information shared among a plurality of devices using a quantum key distribution technique. The key provision step includes providing the generated key information when the operation state satisfies a predetermined condition and stopping provision of the generated key information when the operation state does not satisfy the condition.

Hereinafter, preferred embodiments of an information processing device according to the invention will now be described in detail with reference to the appended drawings.

First Embodiment

As described above, the quantum key distribution (QKD) is a technique for sharing an encryption key safely between a transmitting device (transmitter) that is via an optical fiber and continuously transmits a single photon and a receiving device (receiver) that receives a single photon. Here, the shared encryption key is guaranteed not to be eavesdropped by the principle of quantum mechanics. The shared encryption key is used for cryptographic communication between devices. For example, a cryptographic communication scheme that uses an encryption key of the same size (amount) as the size (amount) of information to be transmitted and received that is called one time pad, and discards an used encryption key is known. If cryptographic data communication is performed using one time pad, it is guaranteed by an information theory that data at this time is unable to be deciphered by an eavesdropper having any knowledge.

In the QKD system, the transmitting device generates a random number serving as a basis of an encryption key to be shared, encrypts the generated random number into a single photon, and sends the encrypted photon to the receiving device via the optical fiber. The receiving device decrypts and detects the transmitted single photon. Further, a predetermined process is executed between the transmitting device and the receiving device, and then a common encryption key is finally generated between the transmitting device and the receiving device. The predetermined process includes a shifting process, an error correction process, and a privacy amplification.

In a current technical level, since it is difficult to operate a complete a single photon source in a real environment, a pseudo single photon is usually generated by attenuating an optical pulse output of a laser device. In the QKD system, since it is necessary to transmit a photon while keeping a quantum state, an amplifier currently used in Internet communication is unable to be used. Usually, when the QKD system is operated in a real environment, a dedicated optical fiber that does not go through an amplifier is used. A transmission path of a photon is also referred to as a quantum communication path.

In addition to the photon transmission, communication between devices for establishing synchronization between the transmitting device and the receiving device is necessary. This communication path is also referred to as a classical communication path. The classical communication path usually uses an optical fiber separate from the quantum communication path. In the final privacy amplification, the safety of the encryption key is secured by reducing a final key length in accordance with a possibility of eavesdropping. In general, the possibility of eavesdropping is determined with an error rate of quantum communication.

As described above, the safety of the encryption key is secured by reducing the length (key length) of the encryption key in accordance with the error rate of quantum communication in the privacy amplification. In the safety theory of QKD that theoretically proves the safety of the encryption key, there are several prerequisites (predetermined conditions) to be satisfied. Therefore, when the QKD system is designed and manufactured, it is necessary to design and manufacture it so that these prerequisites are satisfied. Further, it is necessary for these prerequisites to be satisfied even during the operation of the QKD system. However, if a certain abnormality occurs during an operation of a device, and some of these prerequisites are not satisfied, the encryption key is not safe.

In a case in which the quantum error rate increases, in the privacy amplification, the size of the encryption key decreases or becomes zero in consideration of the safety. However, the error rate of quantum cryptography is likely not to increase depending on a type of abnormality. In this case, the encryption key is generated without any consideration in the privacy amplification. For example, in a case in which there is an abnormality in a random number generator being used, and uniform random numbers are not generated (for example, information alternately repeating 0 and 1 are generated as random numbers), content of an encryption key is easily tapped (since 0 and 1 are simply repeated alternately), the error rate of quantum communication does not increase. As a result, although the encryption key is not safe, eavesdropping is unable to be detected in the privacy amplification, and cryptographic communication is performed using an unsafe encryption key.

There are several prior studies as countermeasures against such problems, but these are only countermeasures against attacks using vulnerabilities of specific devices. Although implementing all these countermeasures comprehensively is considered, such a method makes a device configuration complicated and becomes weak against unknown attacks.

In this regard, an information processing device according to a first embodiment employs a method of monitoring an operation state (operation abnormality) of a device for items related to the safety theory of QKD and not providing an encryption key when any abnormality is detected (for example, discarding a generated encryption key). Accordingly, it is possible to prevent a device configuration from being complicated, prevent an unsafe encryption key from being provided erroneously, and secure the safety of the key.

First, a flow of a process of quantum key distribution and quantum cryptography will be described with reference to FIG. 1. A process outputting encryption key information necessary for cryptographic communication by executing the following respective processes is a quantum key distribution process.

1. Photon Transmission/Reception Process

A transmitting device 100 (an example of an information processing device) transmits a single photon to a receiving device 200 via a quantum communication path capable of transmitting a single photon (photon transmission process). The receiving device 200 detects the transmitted single photon (a photon detection process). The transmitting device 100 records basis information (a transmission basis) and bit information (a transmission bit) when the photon is transmitted. The receiving device 200 records basis information (a reception basis) and reception bit information (a reception bit) when the photon is received. The transmission bit and the transmission basis are randomly selected for each photon within the transmitting device 100. The reception basis is randomly selected for each photon within the receiving device 200. Here, the recorded information is referred to as transmitted photon information on the transmitting device 100 side, and referred to as detected photon information on the receiving device 200 side.

2. Shifting Process

The shifting process is executed by inputting the transmitted photon information in the transmitting device 100 and inputting the detected photon information in the receiving device 200. First, photon selection information is exchanged between the transmitting device 100 and the receiving device 200. Next, only the detected photon information in which the transmission basis when the transmitting device 100 transmits the corresponding photon coincides with the reception basis when the receiving device 200 receives the corresponding photon and the transmitted photon information corresponding thereto are selected by the transmitting device 100 and the receiving device 200, respectively. The transmitting device 100 outputs a data string including the transmission bit of the selected transmitted photon information as shift key information, and the receiving device 200 outputs a data string including the reception bit of the selected detected photon information as shift key information. In order to execute this process, it is necessary for the identifications of the photons to coincide with each other between transmission and reception. For this reason, the transmitting device 100 and the receiving device 200 normally operate in synchronization with each other. A noise on an optical fiber, a noise caused by a photon detector characteristic of a receiver, a trace of eavesdropping by an eavesdropper, or the like at the time of the photon transmission/reception process may be included in the photon transmitted from the transmitting device 100 to the receiving device 200. For this reason, the shift key information of the transmitting device 100 and the receiving device 200 may be partially different (include an error). The transmitting device 100 and the receiving device 200 calculate an error rate by exchanging a part of the shift key information. Generally, the error rate is referred to as an estimation error rate (referred to as estimation because information of the entire shift key is not used). The calculation of the estimation error rate is performed on either or both of the transmitting device 100 and the receiving device 200. If the estimation error rate is below a certain level, a subsequent error correction process is executed.

3. Error Correction Process

The error correction process is executed by inputting the shift key information after the shifting process. The purpose of the error correction process is to correct the error included in the shift key information and to output a bit string that exactly matches between the transmitting device 100 and the receiving device 200. The completely matched bit string is referred to as error correction key information. In the process of the error correction process, error correction control information is exchanged between the transmitting device 100 and the receiving device 200. As a result of this process, it is possible to calculate the error rate for the information of the entire shift key.

4. Privacy Amplification

The privacy amplification is executed by inputting the error correction key information after the error correction process. The purpose of the privacy amplification is to counteract an amount of information that is likely to theoretically leak in the photon transmission/reception process, the shifting process, and the error correction process on the basis of a theory of quantum cryptography and to output a bit string (referred to as encryption key information) that exactly matches between the transmitting device 100 and the receiving device 200. Specifically, the error correction key information is compressed by an amount of information that is likely to leak. A degree of compression is decided by a quantum cryptography theory on the basis of statistical information obtained by the process up to the privacy amplification. A processing procedure of the privacy amplification may include a process of exchanging privacy amplification control information between the transmitting device 100 and the receiving device 200.

Figure 2:
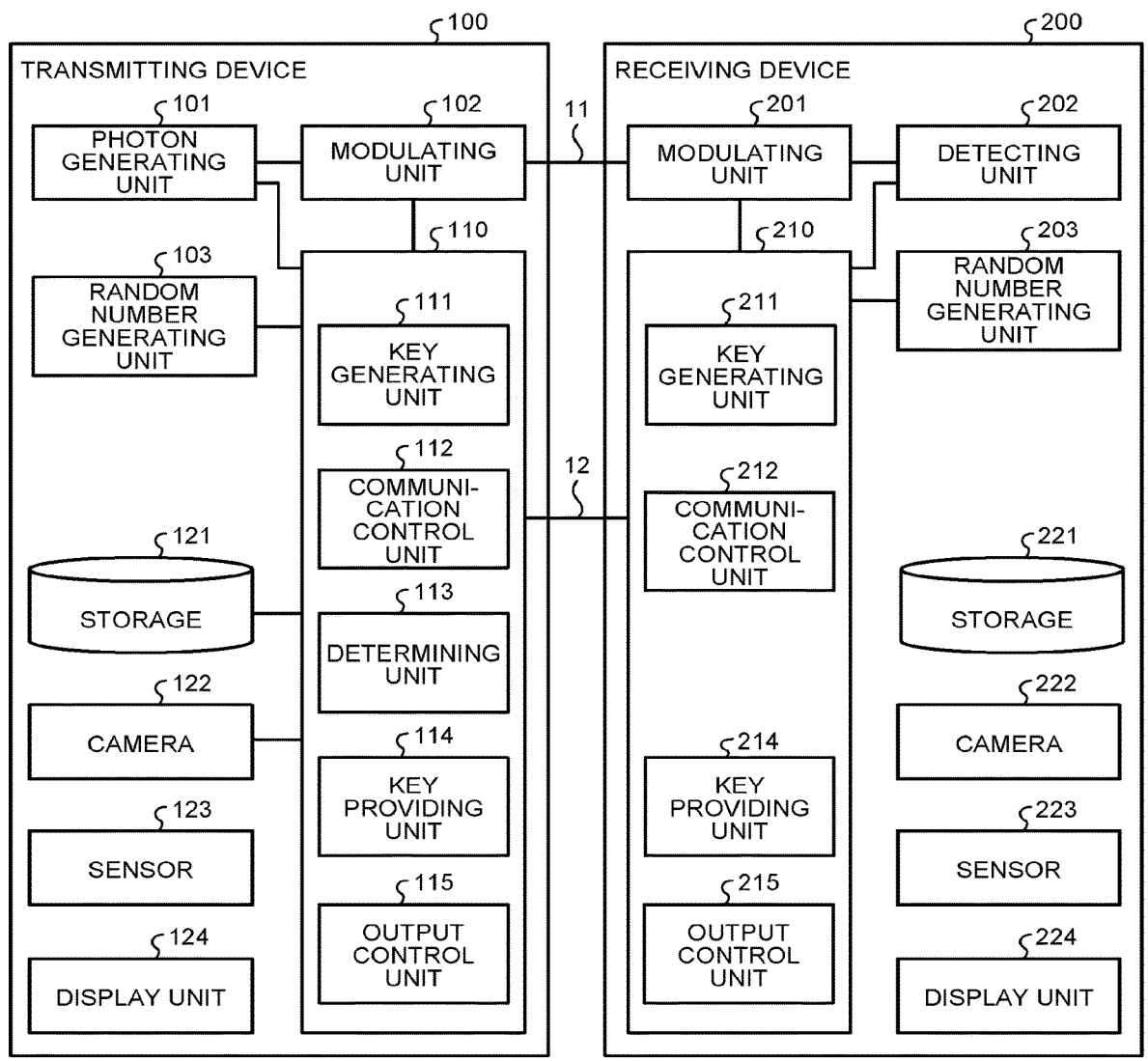
FIG. 2 is a functional block diagram of a communication system according to a first embodiment.

Next, a configuration example of a communication system (QKD system) of the first embodiment will be described. FIG. 2 is a block diagram illustrating a functional configuration example of the communication system of the first embodiment. In the communication system, the transmitting device 100 and the receiving device 200 are connected via a quantum communication path 11 and a classical communication path 12 as illustrated in FIG. 2.

First, the transmitting device 100 will be described. The transmitting device 100 includes a photon generating unit 101, a modulating unit 102, a random number generating unit 103, a control unit 110, a storage 121, a camera 122, a sensor 123, and a display unit 124.

The photon generating unit 101 generates a single photon. The photon generating unit 101 may use a light source that attenuates a common laser light source as a single photon source. In a case in which a common laser light source is used, when the transmission basis and the transmission bit information are encoded by the transmitting device 100, a plurality of photons other than a single photon may be transmitted. In order to prevent this case and to guarantee the safety of the quantum key distribution, a method called a decoy technique may be used. In the decoy technique, an intensity of an output laser is not necessarily constant, but transmission is performed with a laser output intensity different from that when a normal bit is transmitted. In this case, the photon generating unit 101 may be constituted by an attenuator, a driving circuit thereof, and the like in addition to a semiconductor laser. A single photon generation operation may be realized by causing the laser light source to be pulse-driven. A driving speed is high and is, for example, 1 GHz. The driving speed may be faster or slower than 1 GHz.

The modulating unit 102 modulates the photon on the basis of the randomly selected transmission bit and the transmission basis. Either a phase of light or polarization may be used for the modulation. For example, in a case in which phase modulation is used, modulation amounts corresponding to bit values 0 and 1 are allocated 0 and $\pi$, and modulation amounts corresponding to basis values 0 and 1 are allocated 0 and $\pi/2$. A modulation amount finally given in instruction to the modulating unit 102 is a sum of the modulation amount of the bit value and the modulation amount of the basis value. The selection of the transmission bit and the transmission basis is performed for each photon. When the transmission basis is selected, basically, the modulating unit 102 randomly selects two types of bases at a probability of 50:50. In order to distribute the encryption key more efficiently, the modulating unit 102 may ramp the ratio and select the transmission basis at a different ratio.

The control unit 110 controls the operations of the photon generating unit 101 and the modulating unit 102 in order to realize the above process. The control unit 110 also controls the execution of the shifting process, the error correction process, and the privacy amplification in the transmitting device 100. The function of the control unit 110 will be described later in detail.

The random number generating unit 103 generates a random number to be used by the control unit 110. Generally, a physical random number source is used.

The storage 121 stores various types of information used in various types of processes executed by the transmitting device 100. For example, the storage 121 stores the encryption key information generated by the privacy amplification.

The camera 122 and the sensor 123 are examples of a detection device for detecting unauthorized access to the transmitting device 100. The camera 122 is an imaging device that captures an image of an imaging region such as, for example, the periphery of the transmitting device 100. The sensor 123 is, for example, a human sensor and a detection sensor for detecting opening of housing. The camera 122 and the human sensor correspond to a detection device for detecting intrusion of an object (such as a person) into a region in which the transmitting device 100 is installed.

Only one of the camera 122 and the sensor 123 may be installed. Further, at least one of the camera 122 and the sensor 123 may be installed outside the transmitting device 100 (for example, a region in which the transmitting device 100 is installed). In this case, the transmitting device 100 receives detection information (an image, a detection signal, or the like) from the external camera 122 and the sensor 123. Further, a determining unit 113 (monitoring unit) in the control unit 110 to be described later monitors the operation state (first determination information) with reference to the received detection information, and determines whether or not an encryption key (encryption key information) is provided.

The display unit 124 is a display device for displaying information handled in various types of processes by the transmitting device 100, and is realized by, for example, a liquid crystal display, a touch panel having a display function, and the like. The display unit 124 is used, for example, to output information indicating that the provision of the encryption key is stopped.

Next, the receiving device 200 will be described. The receiving device 200 includes a modulating unit 201, a detecting unit 202, a random number generating unit 203, a control unit 210, a storage 221, a camera 222, a sensor 223, and a display unit 224.

Similarly to the process in the transmitting device 100, the modulating unit 201 modulates the transmitted photon on the basis of a randomly selected reception basis. Either a phase of light or polarization may be used for the modulation, but it is necessary to match it with the modulation in the transmitting device 100. For example, when the phase modulation is used, the modulation amounts corresponding to the basis values 0 and 1 are allocated 0 and $\pi/2$. When the reception basis is selected, basically, the modulating unit 201 randomly selects two types of bases at a probability of 50:50. In order to distribute the encryption key more efficiently, the modulating unit 201 may ramp this ratio and select the reception basis at a different ratio. It is desirable that this ratio is identical to that of the transmission basis.

The detecting unit 202 detects the photon output from the modulating unit 201. For the photon detection, a photon detection element called an avalanche photodiode (APD) may be used. The APD may be, for example, an APD formed of indium gallium arsenide, silicon, germanium, or gallium nitride. The APD is driven in an operation mode called a Geiger mode. In the Geiger mode, a single photon is detected by causing a reverse voltage of the APD to be equal to or higher than a breakdown voltage and causing an operation to be performed and generating a large pulse when the photon is incident by an avalanche effect. The detecting unit 202 continuously performs a single photon detection operation by supplying a square wave or sinusoidal voltage including a voltage exceeding the breakdown voltage and a voltage less than the breakdown voltage. The driving speed is high and is, for example, 1 GHz. The driving speed may be faster or slower than 1 GHz. The reception basis is decoded in association with the phase of light or the polarization. The detecting unit 202 uses a photon detection result as the reception bit.

The control unit 210 controls the modulating unit 201 and the detecting unit 202 such that the above process is executed. The control unit 210 also controls the execution of the shifting process, the error correction process, and the privacy amplification in the receiving device 200. The functions of the control unit 210 will be described later in detail.

The random number generating unit 203 generates a random number to be used by the control unit 210. Generally, a physical random number source is used.

The storage 221 stores various types of information used in various types of processes executed by the receiving device 200. For example, the storage 221 stores the encryption key information generated by the privacy amplification.

The camera 222 and the sensor 223 are examples of a detection device for detecting unauthorized access to the receiving device 200. The camera 222 and the sensor 223 can be realized by devices similar to the camera 122 and the sensor 123 of the transmitting device 100.

Only one of the camera 222 and the sensor 223 may be installed. Further, at least one of the camera 222 and the sensor 223 may be installed outside the receiving device 200 (for example, a region in which the receiving device 200 is installed). In this case, the receiving device 200 receives the detection information (an image, a detection signal, or the like) from the external camera 222 and the sensor 223.

The display unit 224 is a display device for displaying information handled in various types of processes by the receiving device 200, and is realized by, for example, a liquid crystal display, a touch panel having a display function, and the like. The display unit 224 is used, for example, to output the output information indicating that the provision of the encryption key is stopped.

In order to execute the shifting process, the control unit 110 of the transmitting device 100 and the control unit 210 of the receiving device 200 are synchronized in time, and the identification of the photon is matched between the transmission and the reception on the basis of the time. For example, each of the control unit 110 of the transmitting device 100 and the control unit 210 of the receiving device 200 includes an oscillator, and the oscillators are synchronized with each other. A number is allocated to the photon on the basis of a count counted by the oscillator, and the number is used to cause the identification of the photon to be matched between the transmission and the reception. A synchronization signal for oscillator synchronization is transmitted between the transmitting device 100 and the receiving device 200. The synchronization signal is transmitted via the same classical communication path 12 as, for example, the photon selection information. The synchronization signal may be transmitted on a communication path different from the classical communication path 12.

As the quantum communication path 11 and the classical communication path 12, a standard single mode optical fiber is often used, but a multimode optical fiber may be used. In the latter case, each of the quantum communication path 11 and the classical communication path 12 correspond to one core of the multimode. Since the intensity of light greatly differs between the single photon and the photon selection information, both optical fibers are allocated different optical fibers (or different cores).

Next, the prerequisites required for the safety theory of the quantum cryptography are described. It also depends on the protocol of the quantum cryptography, but, for example, satisfying the following preconditions (C1) to (C4) is necessary for the safety of the quantum cryptography. These conditions are not taken into account in the key length calculation in the privacy amplification.

(C1) An eavesdropper is unable to perform unauthorized access to a device in order to steal encryption key information inside the transmitting device 100 and the receiving device 200 or device configuration information.

(C2) Random numbers used in the transmitting device 100 and the receiving device 200 are physically uniform random numbers.

(C3) The classical communication path 12 uses an authentication scheme that is unable to be fabricated in term of an information theory (for example, an authentication scheme described in Carter, L., Wegman, M. N., Universal classes of hash functions, J. Comput. Syst. Sci. 18, 143-154 (1979)).

(C4) An eavesdropper follows the laws of physics.

In addition to the above conditions, the following conditions (C5) to (C8) are also required at the time of implementation. Here, in a case in which these conditions are not satisfied, the error rate or the like deviates from an ideal state at the time of key length calculation in the privacy amplification, and thus it is considered that there is a possibility of eavesdropping (in the quantum cryptography, when it is a device abnormality, all things are regarded as a possibility of eavesdropping), and no key is generated.

(C5) Light modulation has to be correctly performed. For example, in the case of the phase modulation scheme, when the phase is changed 90 degrees, it has to be changed 90 degrees correctly.

(C6) A light source has to be a single photon source. For example, in a case in which the decoy scheme is used, the light intensity of the light source has to be constant at a predetermined intensity, a phase of a photon to be output has to be a random phase, and the number of photons has to have a Poisson distribution.

(C7) A light detector (detecting unit 202) does not has noise other than a signal by a photon at all.

(C8) In a path of light including the quantum communication path 11, a state of a photon does not change except when eavesdropping occurs.

Next, functional configurations of the control units 110 and 210 will be described in detail. The control unit 110 includes a key generating unit 111, a communication control unit 112, a determining unit 113, a key providing unit 114, and an output control unit 115 as illustrated in FIG. 2. The control unit 210 includes a key generating unit 211, a communication control unit 212, a key providing unit 214, and an output control unit 215.

The key generating units 111 and 211 control, for example, the execution of the shifting process, the error correction process, and the privacy amplification, for example, and generate the encryption key to be shared. The generated encryption key is stored in, for example, the storage 121 and 221. The storage 121 and 221 may store the encryption key together with identification information (such as a key number) identifying the encryption key and time information indicating a time at which the encryption key is stored.

The communication control units 112 and 212 control transmission and reception of information with other devices. For example, the communication control unit 212 of the receiving device 200 transmits first determination information for determining the operation state of the key generation process by the key generating unit 211 to the transmitting device 100 (the communication control unit 112). Further, the communication control unit 112 of the transmitting device 100 receives the first determination information transmitted from the receiving device 200 and the first determination information for determining the operation state of the key generation process by the key generating unit 111 of the transmitting device 100. In the present embodiment, (information indicating) the operation state is used as the first determination information.

The operation state indicates, for example, a state of the operation that is not taken into account in the key length calculation of the privacy amplification. More specifically, the operation state includes at least one of, for example, randomness (C2) of the random number used for generating the encryption key, an authentication setting (C3) of the communication, a characteristic (C6) of the light source of the photon to be transmitted, and a characteristic (C5) of the modulating unit 102 modulating the photon. The operation state also includes an output result (C1) of a detection device for detecting unauthorized access to the transmitting device 100 and the receiving device 200.

The operation state is not limited to these examples. This is because an element regarding the safety of the encryption key may change depending on the protocol of the quantum key distribution. In addition to the above examples regarding the element regarding the safety of the encryption key, it may be added as an operation state collection target if necessary.

The determining unit 113 monitors the operation state (the first determination information) and determines whether or not the generated encryption key (the encryption key information) is provided on the basis of the operation state. For example, the determining unit 113 determines whether or not the operation state satisfies a condition of safety described above, and determines that the encryption key is to be provided when the condition is satisfied. The determining unit 113 may collect the operation state in real time or may collect the operation state each time a certain period of time elapses. A plurality of types of operation states are assumed, but a collection timing of each operation state may be independent among a plurality of types. In other words, if collection of information indicating each operation state can be prepared, it may be sequentially transmitted to the determining unit 113.

The unauthorized access to the transmitting device 100 and the receiving device 200 can be determined, for example, by monitoring output results (images, sensor outputs, or the like) from the camera 122 (222) and the sensor 123 (223) through the determining unit 113. For example, the determining unit 113 analyzes an image output from the camera 122 (222), and determines that there is unauthorized access when a mobile object such as a person is detected. Further, when a signal is output from the human sensor or the detection sensor for detecting the opening of the housing, the determining unit 113 determines that there is unauthorized access.

The key providing units 114 and 214 provide the generated encryption key when the operation state is determined to satisfy the condition of safety, and stop the provision of the generated encryption key when the operation state is determined not to satisfy the condition of safety.

The key providing units 114 and 214 provide the encryption key determined to be provided by the determining unit 113, for example, to an application or the like using the encryption key. The key providing units 114 and 214 may delete the encryption key determined to be unable to be provided from the storage 121 and 221.

The encryption keys provided by the key providing units 114 and 214 or the encryption keys to be deleted may be determined depending on a time at which the encryption key is generated (stored). For example, the determining unit 113 collects the operation state together with the time information from the transmitting device 100 and the receiving device 200 or stores the time at which the operation state is collected in the storage 121 or the like. If the determining unit 113 determines that there is an abnormality at a certain time A in the transmitting device 100 or the receiving device 200, the determining unit 113 instructs the key providing units 114 and 214 to stop the key provision and to delete the key stored at and after the time A. Upon receiving this instruction, the key providing units 114 and 214 delete the encryption key stored at and after the time A, and stop providing the encryption key until the abnormality is solved.

The key providing units 114 and 214 may continuously provide the stored encryption key before an abnormality occurs (before the time A). In a case in which it is determined that the abnormality is solved, the key providing units 114 and 214 may resume provision of the encryption key generated thereafter.

The output control unit 115 controls output of various types of information handled by various types of processes by the transmitting device 100. For example, the output control unit 115 displays, on the display unit 124, the output information indicating that the provision of the encryption key is stopped when the provision of the encryption key is stopped. Note that the method of outputting the output information is not limited to the method of displaying on display unit 124 or the like, and any method may be used. For example, the following output methods may be used:

A method of outputting the output information by light using an illuminating device such as an LED;

A method of outputting the output information by a sound using a sound output device such as a speaker;

A method of outputting the output information to a designated output destination (an e-mail address, an administrator terminal, or the like) via a network;

A method of outputting the output information to a medium such as paper using an output device such as a printer; and A method of outputting the output information as electronic data such as a log file.

The output control unit 215 controls the output of various types of information handled by various types of processes by the receiving device 200. For example, the output control unit 215 displays, on the display unit 224, the output information indicating that the provision of the encryption key is stopped when the provision of the encryption key is stopped. A notification indicating that the provision of the encryption key is stopped may be given from the determining unit 113 of the transmitting device 100 or may be given from the key providing unit 214 which has stopped the provision of the key in accordance with an instruction from the determining unit 113. The output information output method by the output control unit 215 is similar to that of the output control unit 115.

Note that the output information may be output only by any one of the transmitting device 100 and the receiving device 200. In this case, the device that does not output the output information may not have the output control unit and the display unit.

The output control units 115 and 215 output the output information when the provision of the encryption key is stopped, in other words, at a timing at which the operation state is determined not to satisfy the condition of safety. For example, the output control unit 115 (215) displays, on the display unit 124 (224), the output information indicating that the provision of the encryption key is stopped at the timing when the opening of the housing is detected by the detection sensor. Also, the output control unit 115 (215) displays, on the display unit 124 (224), the output information indicating that the provision of the encryption key is stopped at the timing when at least one of the camera 122 (222) and the human sensor detects the intrusion of the object into the region in which the transmitting device 100 (the receiving device 200) is installed.

Each of the above units (the control units 110 and 210) is realized, for example, by one or more processors. For example, each of the above units may be realized by causing a processor such as a central processing unit (CPU) to execute a program, that is, by software. Each of the above units may be realized by a processor such as a dedicated integrated circuit (IC), that is, hardware. Each of the above units may be realized by using software and hardware in combination. In a case in which the one or more processors are used, each processor may realize one of each unit or may realize two or more of the units.

Each of the storage 121 and 221 can be constituted by any commonly used storage medium such as a flash memory, a memory card, a random access memory (RAM), a hard disk drive (HDD), or an optical disk.

Figure 3:
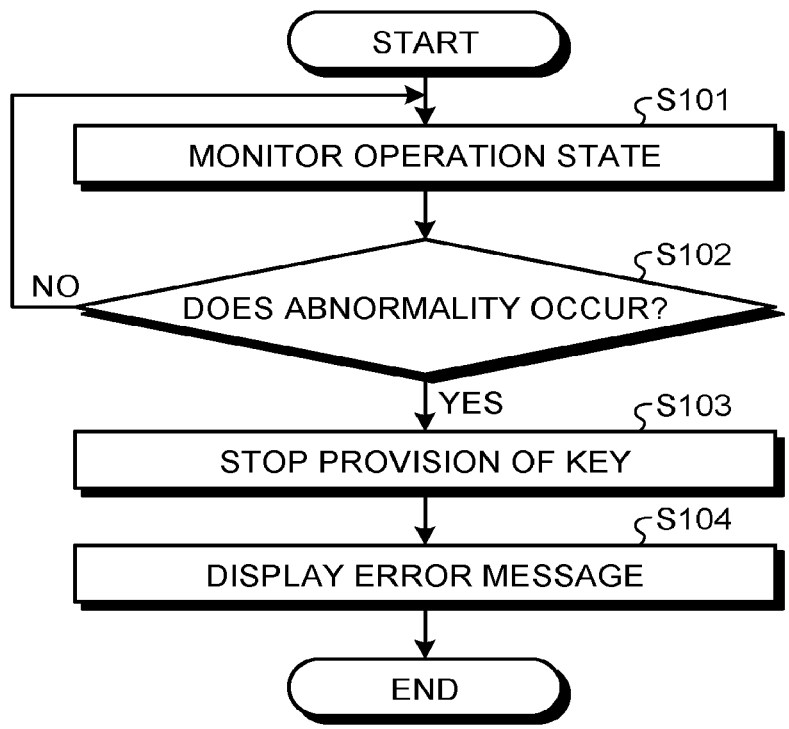
FIG. 3 is a flowchart of a monitoring process in the first embodiment.

Next, the monitoring process by the communication system having the above configuration according to the first embodiment will be described. FIG. 3 is a flowchart illustrating an example of the monitoring process in the first embodiment.

The determining unit 113 monitors the operation state received by the communication control unit 112 (Step S101). The determining unit 113 determines whether or not an abnormality occurs in the generation of the encryption key on the basis of the operation state (Step S102). The determining unit 113 determines whether or not an abnormality occurs, for example, depending on whether or not the above conditions (C1) to (C8) are satisfied. The abnormality determination process will be described later in detail.

In a case in which no abnormality occurs (Step S102: No), the determining unit 113 returns to Step S101 and repeats the process. In a case in which an abnormality occurs (Step S102: Yes), the key providing units 114 and 214 stops providing the generated encryption key (Step S103).

Figure 4:
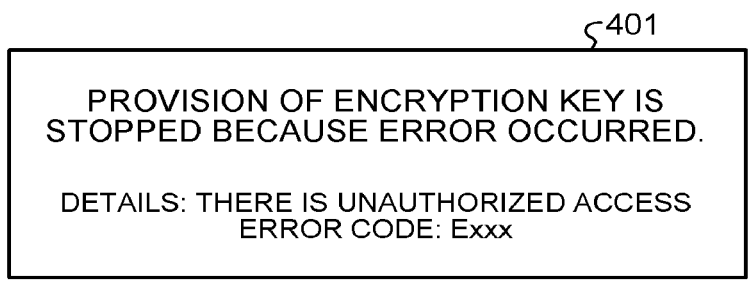
FIG. 4 is a diagram illustrating an example of a display screen in the first embodiment.

The output control unit 115 (215) outputs the output information indicating that the provision of the encryption key is stopped to, for example, the display unit 124 (224) (Step S104). FIG. 4 is a diagram illustrating an example of a display screen 401 displayed on the display unit 124 (224).

As illustrated in FIG. 4, the display screen 401 includes an error message indicating that the provision of the encryption key is stopped (an example of the output information), the details of error content (an example of information indicating the cause of the stop), and an error code (an example of information indicating the cause of the stop). The display screen 401 may include other information. Also, when at least the output information indicating that the provision of the encryption key is stopped is output, at least one of the details of the error content and the error code may not be output.

As described above, the output information output method is not limited to the method of displaying on the display screen 401. For example, when the illuminating device is used, the output control unit 115 (215) may turn on the illuminating device when the provision of the encryption key is stopped. The output control unit 115 (215) may be configured to indicate the details of the error content in accordance with a light lighting method (a color of light, the presence or absence of blinking, an interval of blinking, or the like).

When the sound output device is used, the output control unit 115 (215) may output a voice message indicating that the provision of the encryption key is stopped. The output control unit 115 (215) may output a sound such as a buzzer sound or an alert sound when the provision of the encryption key is stopped. The output control unit 115 (215) may be configured to indicate the details of the error content in accordance with a sound output method (a pitch of a sound, a size of a sound, an output time, an output interval, or the like).

Next, the operation state collection process and the abnormality determination process will be described in detail. As described above, the transmitting device 100 and the receiving device 200 have a function of monitoring the operation state related to the condition that is not taken into consideration in the key length calculation of the privacy amplification. (M1) to (M8) below are examples of the operation state collection method and the abnormality judgment method respectively corresponding to (C1) to (C8) above. Further, it is not necessary to monitor and determine all the operation states related to the eight conditions, and only some of them may be determined. For example, the conditions of (C5) to (C8) may be monitored when it is necessary to further enhance the safety of the encryption key. The following abnormality determination process is an example, and the present embodiment is not limited to this example.

(M1) For example, a location at which the device (the transmitting device 100 and the receiving device 200) is installed is monitored, or opening of a device housing, is detected. The operation states are detected (collected) by the detection device such as camera 122 and the sensor 123. The determining unit 113 determines that there is an abnormality if there is unauthorized access.

(M2) The determining unit 113 has a function of verifying a random number and verifies the randomness of the generated random number. The determining unit 113 determines that the verification fails if there is an abnormality in the randomness. The determining unit 113 verifies the randomness in accordance with, for example, NIST SP800-22. The determining unit 113 may perform random test on random numbers generated by, for example, the random number generating unit 103, and use the random number after the test process for generating the encryption key. The random number generated by the random number generating unit 103 may be temporarily stored in the storage 121 or the like and the determining unit 113 may perform the verification process on the stored random number.

(M3) The determining unit 113 monitors whether or not the authentication scheme is changed from an initially set state. For example, the determining unit 113 determines whether or not there is a change by comparing information indicating the authentication scheme with information indicating the initially set authentication scheme. The determining unit 113 determines that there is an abnormality if there is a change in the setting.

(M4) The conditions of (C4) are considered to be normally satisfied and thus may not be monitored.

(M5) The determining unit 113 generates a photon of fixed phase modulation using the photon generating unit 101 and the modulating unit 102, and monitors whether or not the photon detection result on the receiving device 200 is within a predetermined range from a steady state. For example, the determining unit 113 performs such monitoring by operating in synchronization with the control unit 210 of the receiving device 200.

(M6) The determining unit 113 measures the intensity of the light source in the transmitting device 100 and monitors whether or not the measured intensity is within a predetermined range. For example, the randomness of the phase is determined by periodically extracting photons that are consecutively output among photons output from the light source and determines whether or not a result of interfering is random. It is also determined whether or not the number of photons has the Poisson distribution, for example, by extracting some of photons to be output, obtaining the distribution of the number of photons, and determining whether or not it matches the Poisson distribution.

(M7) The determining unit 113 measures the noise of the detecting unit 202 and monitors whether or not the change from the steady state falls within a predetermined range.

(M8) The determining unit 113 monitors information (temperature, humidity, vibration, or the like) indicating an environment around a device for the light path in the device (the transmitting device 100 and the receiving device 200). The determining unit 113 determines that an abnormality occurs, for example, when a variation amount of information exceeds a predetermined threshold value. For the optical fiber between devices, it is difficult to satisfy this condition, so it is not necessary to consider it.

As described above, the information processing device according to the first embodiment monitors the operation state (operation abnormality) of the device for the items related to the safety theory of QKD and stops providing the encryption key when any abnormality is detected. Accordingly, it is possible to prevent a device configuration from being complicated, prevent an unsafe encryption key from being provided erroneously, and secure the safety of the key.

Second Embodiment

In the first embodiment, the determining unit is installed only on the transmitting device side. In a second embodiment, a determining unit is installed on the receiving device side as well.

Figure 5:
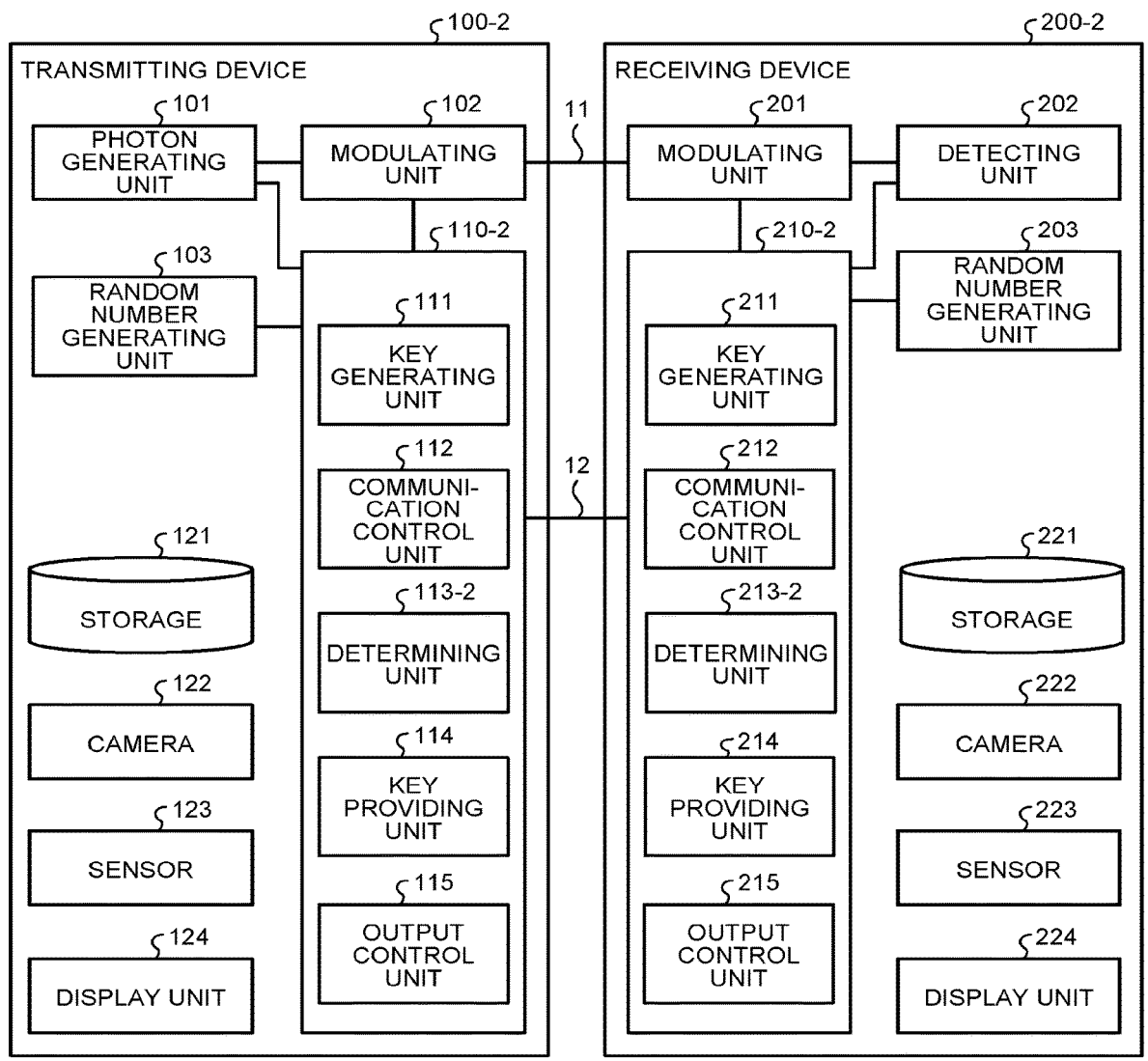
FIG. 5 is a functional block diagram of a communication system according to a second embodiment.

FIG. 5 is a block diagram illustrating a functional configuration example of the communication system according to the second embodiment. In the communication system, a transmitting device 100-2 and a receiving device 200-2 are connected via a quantum communication path 11 and a classical communication path 12 as illustrated in FIG. 5.

The transmitting device 100-2 of the second embodiment differs from that of the first embodiment in a function of a determining unit 113-2 in a control unit 110-2. The receiving device 200-2 of the second embodiment differs from that of the first embodiment in that a determining unit 213-2 is added in a control unit 210-2. Since the other configurations and functions are similar to those in FIG. 2 that is a block diagram of the communication system according to the first embodiment, the same reference numerals are assigned, and description thereof is omitted here.

The determining unit 113-2 and the determining unit 213-2 monitor the operation states of the transmitting device 100-2 and the receiving device 200-2, respectively, and determine whether or not the generated encryption key can be provided on the basis of the operation state. Further, the determining unit 113-2 and the determining unit 213-2 share information of a determination result with each other, and give an instruction indicating that the key is unable to be provided to the corresponding key providing units 114 and 214 when it is determined that at least one of the determining unit 113-2 and the determining unit 213-2 is unable to provide the key.

As described above, in the second embodiment, the determining units installed in both the transmitting device and the receiving device determine the operation states of the devices and can control the provision of the encryption key.

Third Embodiment

In the above embodiment, information indicating the monitoring result of the operation state (first determination information) is transmitted to the determining unit without change. However, there are cases in which it is not desirable from a viewpoint of security to transmit the information indicating the operation state of the device to the outside without change. In this regard, in a third embodiment, information indicating a result determined on the basis of the operation state is used as the determination information (second determination information).

Figure 6:
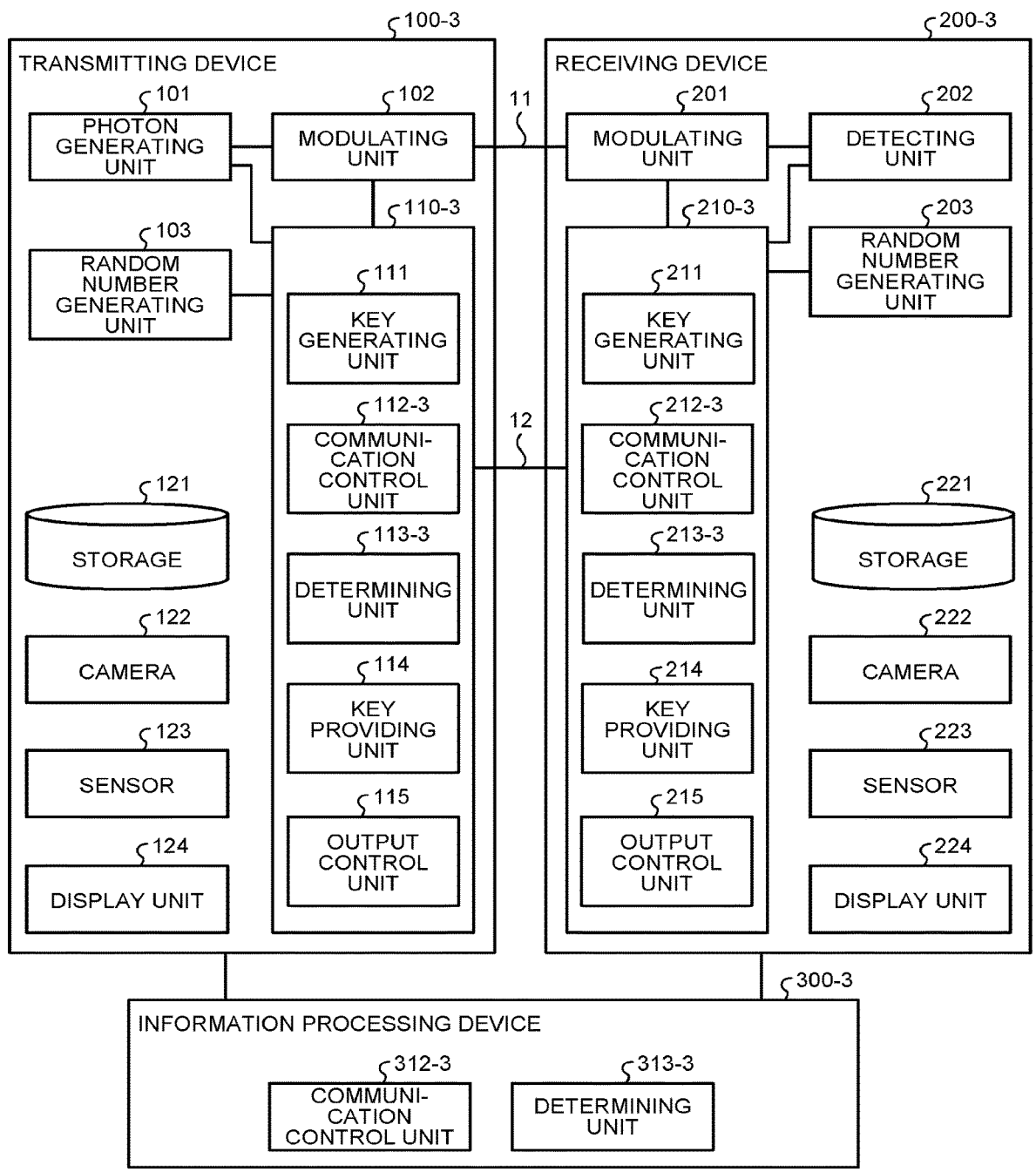
FIG. 6 is a functional block diagram of a communication system according to a third embodiment.

FIG. 6 is a block diagram illustrating a functional configuration example of the communication system according to the third embodiment. In the communication system, a transmitting device 100-3 and a receiving device 200-3 are connected via a quantum communication path 11 and a classical communication path 12 as illustrated in FIG. 6. Further, in the communication system of the third embodiment, the transmitting device 100-3 and the receiving device 200-3 are connected to an information processing device 300-3.

The transmitting device 100-3 and the receiving device 200-3 may be connected with the information processing device 300-3 in any form. For example, the connection may be either a wired network or a wireless network.

The transmitting device 100-3 of the third embodiment differs from the second embodiment in functions of a communication control unit 112-3 and a determining unit 113-3 in a control unit 110-3. The receiving device 200-3 of the third embodiment differs from the second embodiment in functions of a communication control unit 212-3 and a determining unit 213-3 in a control unit 210-3. Since the other configurations and functions are similar to those in FIG. 5 that is a block diagram of the communication system according to the second embodiment, the same reference numerals are assigned, and description thereof is omitted here.

The communication control units 112-3 and 212-3 control transmission and reception of information with other devices. In the present embodiment, instead of the information indicating the operation state, the communication control unit 112-3 transmits a determination result of the determining unit 113-3 to be described later to the information processing device 300-3 as the second determination information. Similarly, the communication control unit 212-3 transmits the determination result by the determining unit 213-3 to be described later to the information processing device 300-3 as the second determination information.

The second determination information is, for example, information indicating whether or not an abnormality occurs in each device. In other words, in the present embodiment, the second determination information does not include information indicating the operation state itself. Accordingly, it is possible to prevent the information indicating the operation state from flowing out to the outside without change.

The determining unit 113-3 and the determining unit 213-3 monitor the operation states of the transmitting device 100-3 and the receiving device 200-3, respectively, and determine whether or not an abnormality occurs in the device on the basis of the operation state. In the present embodiment, the determining unit 113-3 and the determining unit 213-3 output information indicating the determination result to the information processing device 300-3 via the communication control units 112-3 and 212-3.

Similarly to the first embodiment, the determining unit may be installed only in the transmitting device 100-3, and the determining unit may transmit the second determination information to the information processing device 300-3.

The information processing device 300-3 includes a communication control unit 312-3 and a determining unit 313-3.

The communication control unit 312-3 controls transmission and reception of information to and from other devices such as the transmitting device 100-3 and the receiving device 200-3. For example, the communication control unit 312-3 receives the second determination information transmitted from the transmitting device 100-3 and the receiving device 200-3.

The determining unit 313-3 determines whether or not the generated encryption key is provided on the basis of the second determination information transmitted from the respective devices. For example, when at least one of the second determination information received from the transmitting device 100-3 and the second determination information received from the receiving device 200-3 indicates that an abnormality has occurred, the determining unit 313-3 determines that the encryption key is unable to be provided.

The determining unit 313-3 transmits the determination result to the respective devices (the transmitting device 100-3 and the receiving device 200-3) via the communication control unit 312-3. The key providing units 114 and 214 of the respective devices control the provision of the encryption key on the basis of the determination result.

Figure 7:
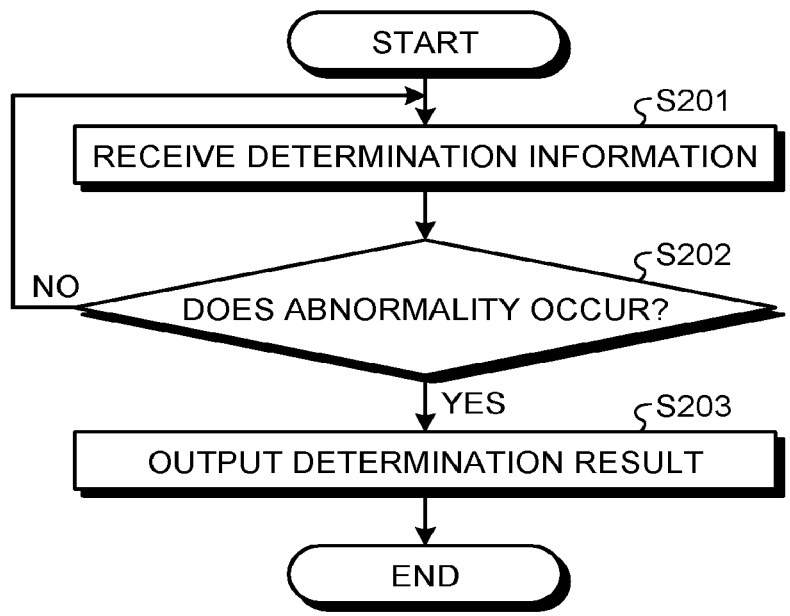
FIG. 7 is a flowchart of a monitoring process in the third embodiment.

Next, the monitoring process by the communication system having the above configuration according to the third embodiment will be described. FIG. 7 is a flowchart illustrating an example of the monitoring process in the third embodiment.

The determining unit 313-3 monitors the second determination information received by the communication control unit 312-3 (Step S201). The second determination information can be transmitted from both the transmitting device 100-3 and the receiving device 200-3. The determining unit 313-3 determines whether or not an abnormality occurs in the generation of the encryption key on the basis of the second determination information (Step S202). For example, the determining unit 313-3 determines that an abnormality occurs in the generation of the encryption key when the second determination information indicating that an abnormality occurs is included in the received second determination information.

In a case in which an abnormality does not occur (Step S202: No), the determining unit 313-3 returns to Step S201 and repeats the process. In a case in which an abnormality occurs (Step S202: Yes), the determining unit 313-3 outputs the determination result to the transmitting device 100-3 and receiving device 200-3 via the communication control unit 312-3 (Step S203).

In a case in which the key providing unit 114 of the transmitting device 100-3 and the key providing unit 214 of the receiving device 200-3 receive the determination result indicating that an abnormality occurs from the information processing device 300-3, the provision of the encryption key is stopped, and the encryption key generated when an abnormality occurs is deleted.

As described above, in the third embodiment, it is possible to finally determine whether or not the encryption key is provided through the information processing device different from the transmitting device and the receiving device performing the quantum key distribution.

As described above, according to the first to third embodiments, it is possible to prevent the encryption key that is unsafe from being provided erroneously and secure the safety of the key.

Finally, an example of a hardware configuration of main parts of each device (the transmitting device and the receiving device) in the first to third embodiments will be described.

Figure 8:
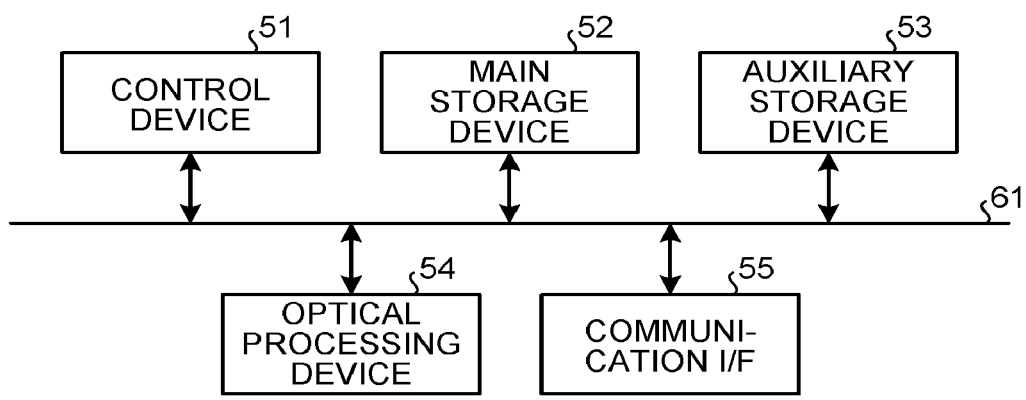
FIG. 8 is a hardware configuration diagram of main parts of devices according to the first to third embodiments.

FIG. 8 is a diagram illustrating an example of a hardware configuration of main parts of the devices according to the first to third embodiments. The devices according to the first to third embodiments include a control device 51, a main storage device 52, an auxiliary storage device 53, an optical processing device 54, and a communication I/F 55. The control device 51, the main storage device 52, the auxiliary storage device 53, the optical processing device 54, and the communication I/F 55 are connected via a bus 61.

The control device 51 executes a program read from the auxiliary storage device 53 to the main storage device 52. The control device 51 is, for example, a CPU. The main storage device 52 is a memory such as a read only memory (ROM) or a RAM. The auxiliary storage device 53 is a memory card, an HDD, or the like.

The optical processing device 54 transmits or receives the single photon via the quantum communication path 11. The communication I/F 55 transmits or receives the control information or the like via the classical communication path 12 such as an optical fiber and Ethernet (registered trademark).

The hardware configuration of the information processing device described in the third embodiment may have, for example, a configuration from which the optical processing device 54 in FIG. 8 is excluded. The information processing device can be realized by, for example, a general personal computer and a server device constructed in a cloud environment or the like.

The program executed by the devices according to the first to third embodiments is stored in a computer readable medium such as a CD-ROM, a memory card, a CD-R, or a DVD in a file having an installable format or an executable format, and provided as a computer program product.

Further, the program executed by the devices according to the first to third embodiments may be stored in a computer connected to a network such as the Internet and provided by downloading via a network. Further, the program executed by the devices according to the first to third embodiments may be configured to be provided via a network such as the Internet without being downloaded.

Further, the programs executed by the devices according to the first to third embodiments may be provided in a form in which it is embedded in a ROM or the like.

A program executed by the transmitting devices according to the first to third embodiments has a module configuration including the functions realizable by the program among the functional configurations of the transmitting devices according to the first to third embodiments. A program executed by the receiving devices according to the first to third embodiments has a module configuration including the functions realizable by the program among the functional configurations of the receiving devices according to the first to third embodiments.

The functions realized by the program is loaded onto the main storage device 52 by reading the program from the storage medium such as the auxiliary storage device 53 and executing the program through the control device 51. In other words, the functions realized by program are generated on the main storage device 52.

Further, some of the functions of the devices according to the first to third embodiments may be realized by hardware such as an IC. The IC is, for example, a processor that executes a dedicated process. In a case in which each function is realized using a plurality of processors, each processor may realize one of the functions or may realize two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing method, comprising:
    monitoring an operation state of an information processing device including a key generating unit that generates key information shared among a plurality of devices using a quantum key distribution technique;
    providing the generated key information when the operation state satisfies a predetermined condition;
    stopping provision of the generated key information when the operation state does not satisfy the condition; and
    outputting output information by at least one of display on a display device, output by light, output by a sound, and output to an output destination via a network when the provision of the key information is stopped, the output information indicating that the provision of the key information is stopped.

2. The information processing method according to claim 1,
    wherein the operation state indicates a state of an operation that is not taken into account in a key length calculation of a privacy amplification.

3. The information processing method according to claim 1, further comprising:
    storing the generated key information in a storage; and
    deleting the key information from the storage when the operation state does not satisfy the condition.

4. The information processing method according to claim 1, further comprising,
    collecting the operation state in real time or each time a predetermined period elapses, and
    determining whether or not the operation state satisfies the condition on the basis of the collected operation state.

5. The information processing method according to claim 1,
    wherein the operation state includes at least one of a randomness of a random number used for generating the key information, an authentication setting of communication, a characteristic of a light source of a photon to be transmitted, and a characteristic of a modulating unit that modulates the photon.

6. The information processing method according to claim 1,
    wherein the operation state includes an output result of a detection device for detecting unauthorized access to the information processing device.

7. The information processing method according to claim 1,
    wherein the outputting includes outputting the output information when unauthorized access to the information processing device is detected.

8. The information processing method according to claim 7,
    wherein the unauthorized access is detected by at least one of a detection device that detects opening of a housing of the information processing device and a detection device that detects intrusion of an object into a region in which the information processing device is installed.

9. The information processing method according to claim 1,
    wherein the outputting includes outputting, together with the output information, information indicating a cause by which the provision of the key information is stopped.

10. The information processing method according to claim 1,
    wherein the condition is a condition obtained by a theory that proves safety of the key information provided by the quantum key distribution technique.

11. An information processing method, comprising:
    receiving second determination information for determining an operation state of a key generation process by a key generating unit that generates key information shared among a plurality of devices using a quantum key distribution technique;
    stopping provision of the generated key information when the second determination information indicating the occurrence of an abnormality is received; and
    outputting output information by at least one of display on a display device, output by light, output by a sound, and output to an output destination via a network when the provision of the key information is stopped, the output information indicating that the provision of the key information is stopped.

12. A computer program product having a non-transitory computer readable medium including programmed instructions, wherein the instructions, when executed by a computer, cause the computer to perform:
    monitoring an operation state of an information processing device including a key generating unit that generates key information shared among a plurality of devices using a quantum key distribution technique;
    providing the generated key information when the operation state satisfies a predetermined condition;
    stopping provision of the generated key information when the operation state does not satisfy the condition; and
    outputting output information by at least one of display on a display device, output by light, output by a sound, and output to an output destination via a network when the provision of the key information is stopped, the output information indicating that the provision of the key information is stopped.

* * * * *